(12) United States Patent
Captarencu

(10) Patent No.: US 12,540,807 B2
(45) Date of Patent: Feb. 3, 2026

(54) COMBINATION SQUARE AND METHOD OF ADJUSTING THE SAME

(71) Applicant: Klein Tools, Inc., Lincolnshire, IL (US)

(72) Inventor: Catalin Virgil Captarencu, Barrington, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 429 days.

(21) Appl. No.: 18/104,678

(22) Filed: Feb. 1, 2023

(65) Prior Publication Data

US 2024/0255267 A1   Aug. 1, 2024

(51) Int. Cl.
*G01B 3/56* (2006.01)
*B43L 7/00* (2006.01)
*G01B 3/04* (2006.01)

(52) U.S. Cl.
CPC ............. *G01B 3/566* (2013.01); *B43L 7/007* (2013.01); *G01B 3/04* (2013.01)

(58) Field of Classification Search
CPC .......... G01B 3/566; G01B 3/04; B43L 7/007; B43L 7/14
See application file for complete search history.

(56) References Cited

U.S. PATENT DOCUMENTS

| | | | | |
|---|---|---|---|---|
| 1,264,161 A * | 4/1918 | Costas | ................. | G01B 3/1092 33/384 |
| 1,984,951 A * | 12/1934 | Stowell | ................. | G01B 3/566 33/464 |
| 5,339,530 A * | 8/1994 | Wright | ................. | G01B 3/566 33/379 |
| 5,377,418 A * | 1/1995 | Anderson | ................. | B43L 7/02 33/469 |
| 5,915,806 A * | 6/1999 | Levee | ................. | B43L 13/02 33/468 |
| 6,785,976 B1 * | 9/2004 | Morehouse | ............. | B43L 7/005 33/495 |
| 6,839,974 B1 * | 1/2005 | Hitchcock | ................. | B43L 7/12 33/DIG. 1 |
| 11,168,970 B1 * | 11/2021 | Turley | ................. | G01B 3/566 |
| 11,378,373 B2 * | 7/2022 | Cross | ................. | G01B 3/004 |
| 11,555,682 B2 * | 1/2023 | Turley | ................. | G01B 3/04 |
| 12,246,899 B2 * | 3/2025 | Schulz | ............... | B65D 73/0014 |
| 2007/0204475 A1 * | 9/2007 | Marcus | ................. | G01B 3/566 33/480 |
| 2014/0290080 A1 * | 10/2014 | Buzzell | ................. | G01B 3/566 33/469 |
| 2021/0325161 A1 * | 10/2021 | Turley | ................. | G01B 3/566 |
| 2024/0255267 A1 * | 8/2024 | Captarencu | ............ | G01B 3/566 |
| 2024/0327087 A1 * | 10/2024 | Schulz | ............... | B65D 73/0014 |

* cited by examiner

Primary Examiner — Yaritza Guadalupe-Mccall

(57) ABSTRACT

A combination square is provided with a square head that includes a pair of bores extending through a blade receiving slot, a pair of pins, each pin having an eccentric outermost surface and being engaged in a corresponding one of the bores, and a ruled blade that is releasably engaged in the slot such that the relative angle between the head and the blade can be adjusted by rotating one or both of the pins about the axis of the corresponding bore.

21 Claims, 8 Drawing Sheets

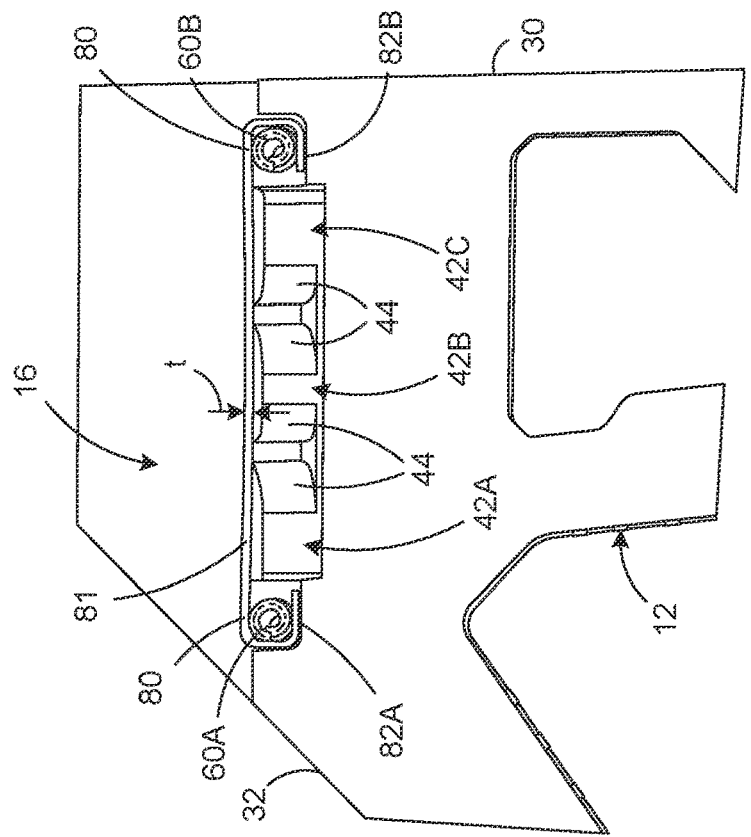
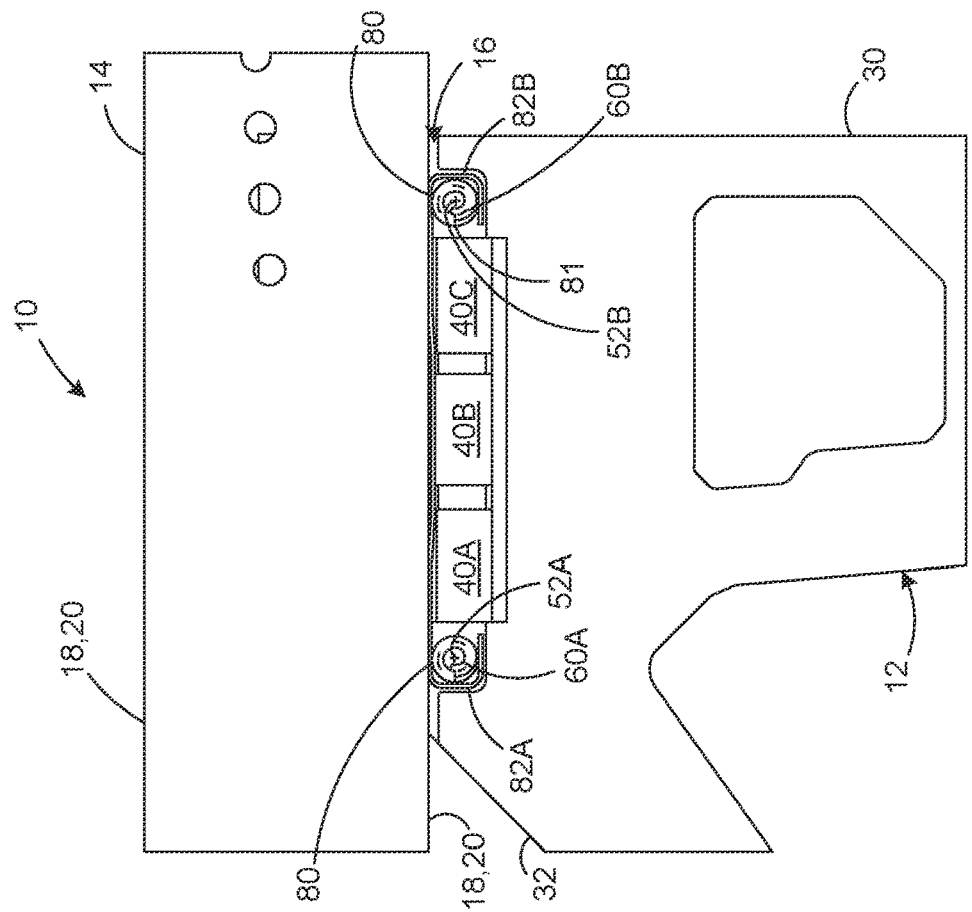
FIG. 10
FIG. 9

COMBINATION SQUARE AND METHOD OF ADJUSTING THE SAME

CROSS-REFERENCE TO RELATED APPLICATIONS

None

BACKGROUND OF THE DISCLOSURE

The present disclosure relates to combination squares having a head with a blade channel or slot, and a ruled blade that is removably retained in the blade slot of the head at any position along the length of the blade. Often, the head includes a pair of planar surfaces or faces that can be abutted against a surface with the ruled blade and a planar edge surface defined at an edge of the ruled blade extending either at a 90 degree angle relative to the planar surface or a 45 degree angle relative to the planar surface depending on which planar surface is being used. Such combination squares are well known and typically incorporate a longitudinal groove extending the length of the blade that can be engaged by a tang on a knob actuated locking bolt to secure the blade to the head at any longitudinal position along the blade. It is also known to use magnetic force to retain the blade in the head at any longitudinal position along the blade.

Regardless of the structure used to retain the blade in the blade slot, the blade and the head must be trued or squared so that the relative angle between the planar surfaces or faces of the head are accurate within a desired tolerance band. In conventional combination squares this relative angle is determined by the engagement of the planar edge surface of the blade against a pair of spaced lands located at the bottom of the blade slot. Typically, to achieve the desired accuracy of the relative angle, the height of these lands is repeatedly adjusted by hand using a file to remove increments of material from the top of the land, with a check of the relative angle being made on a measurement table, block, fixture, or machine between each hand adjustment of the lands. This procedure is labor intensive and time consuming, both of which increase the cost to produce conventional combination squares. There is always a desire to reduce such costs.

BRIEF SUMMARY OF THE DISCLOSURE

In accordance with one feature of this disclosure, a combination square includes a head, a pair of spiral roll pins, and a ruled blade. The head includes a planar head surface to abut a workpiece, a blade receiving slot having an end opening in the planar head surface, and a pair of spaced bores, with each bore centered on a corresponding bore axis and a portion of each bore extending through the blade receiving slot. Each of the pins is engaged in a corresponding one of the bores with a portion of the pin extending through the blade receiving slot and portions of the pin engaged in portions of the corresponding one of the bores on opposite sides of the blade receiving slot. Each pin has a rotational position about the corresponding bore axis. The ruled blade is releasably received in the blade receiving slot and has a planar blade surface that extends from the end opening in the first planar head surface. A relative angle between the planar head surface and the planar blade surface is determined by the rotational position of each of the pins.

In one feature, the combination square of further includes a wear shield located between the planar blade surface and each of the pins, with the wear shield abutting the planar blade surface and each of the pins. In a further feature, the wear shield includes a strip of material having a pair of end segments, each end segment being wrapped around a corresponding one of the pins.

According to one feature, the planar blade surface abuts each of the pins.

As one feature, the relative angle is 90 degrees.

In one feature, the head further includes another planar head surface to abut a workpiece, the blade receiving slot has an end opening in the another planar head surface, a relative angle between the planar head surfaces equals 45 degrees, and a relative angle between the another planar head surface and the planar blade surface is determined by the rotational position of each of the pins.

According to one feature, the combination square of further includes at least one magnet mounted in the head and the blade is releasably retained in the slot by a magnetic force of the at least one magnet.

As one feature, the combination square of further includes at least one of a scriber pin and a bubble level mounted in the head extending parallel to the planar head surface.

In one feature, the head includes a pair of planar slot surfaces facing each other to define the slot, the slot surfaces extending parallel to each other, each of the bores extend through the slot surfaces, and each of the bore axes is perpendicular to the slot surfaces.

In accordance with one feature of this disclosure, a combination square includes a head, a spiral roll pin and a ruled blade. The head has a planar head surface to abut a workpiece, a blade receiving slot having an end opening in the planar head surface, and a bore centered on a bore axis with a portion of the bore extending through the blade receiving slot. The spiral roll pin is engaged in the bore with a portion of the pin extending through the blade receiving slot and portions of the pin engaged in portions of the bore on opposite sides of the blade receiving slot. The ruled blade is releasably received in the blade receiving slot and has a planar blade surface that extends from the end opening in the first planar head surface. A relative angle between the planar head surface and the planar blade surface can be adjusted by rotating at the pin about the bore axis.

In one feature, the combination square further includes a wear shield sandwiched between the planar blade surface and the pin, with the wear shield abutting the planar blade surface and the pin.

As one feature the planar blade surface abuts the pin.

According to one feature, the head further includes another bore centered on another bore axis with a portion of the another bore extending through the blade receiving slot. The combination square further includes another spiral roll pin engaged in the another bore with a portion of the another spiral roll pin extending through the blade receiving slot and portions of the another spiral roll pin engaged in portions of the another bore on opposite sides of the blade receiving slot. A relative angle between the first planar head surface and the planar blade surface can be adjusted by rotating the another spiral roll pin about the another bore axis. In a further feature, the combination square further includes a wear shield sandwiched between the planar blade surface and each of the pins, with the wear shield abutting the planar blade surface and each of the pins. As yet a further feature, the wear shield includes a strip of material having a pair of end segments, each end segment being wrapped around a corresponding one of the pins.

In one feature, the combination square further including at least one magnet mounted in the head and the blade is releasably retained in the slot by a magnetic force of the at least one magnet.

As one feature, the head includes a pair of planar slot surfaces facing each other to define the slot, the slot surfaces extending parallel to each other, the bore extends through the slot surfaces, and the bore axis is perpendicular to the slot surfaces.

In accordance with one feature of this disclosure, a method of squaring is provided for a combination square including a ruled blade and a head, the head having a blade receiving slot and a bore centered on a bore axis with a portion of the bore extending through the blade receiving slot. The method including the steps of inserting the blade into a releasably retained position in the blade receiving slot of the head; and adjusting a relative angle between the head and the blade by rotating a spiral roll pin retained in the bore about the bore axis with a portion of the pin extending through the slot until the blade is squared with the head.

As one feature, the head has another bore centered on another bore axis with a portion of the another bore extending through the blade receiving slot; and the adjusting step further includes rotating another spiral roll pin retained in the another bore about the bore axis with a portion of the another spiral roll pin extending through the slot until the blade is squared with the head.

In one feature, the method further includes retaining the blade in the slot with a magnetic force.

In accordance with one feature of this disclosure, combination square includes a head, a pin having an eccentric outermost surface, and a ruled blade. The head has a planar head surface to abut a workpiece, a blade receiving slot having an end opening in the planar head surface, and a bore centered on a bore axis with a portion of the bore extending through the blade receiving slot. The pin is engaged in the bore with a portion of the pin extending through the blade receiving slot and portions of the pin engaged in portions of the bore on opposite sides of the blade receiving slot. The ruled blade is releasably received in the blade receiving slot and has a planar blade surface that extends from the end opening in the first planar head surface. A relative angle between the planar head surface and the planar blade surface can be adjusted by rotating the eccentric outermost surface of the pin about the bore axis.

It should be understood that the inventive concepts disclosed herein do not require each of the features discussed above, may include any combination of the features discussed, and may include features not specifically discussed above.

BRIEF SUMMARY OF THE SEVERAL VIEWS OF THE DRAWINGS

FIG. 1 is a perspective view from below, front and left of a combination square according to this disclosure;

FIG. 9 is a view similar to FIG. 7 but showing an alternate embodiment of the combination square according to this disclosure;

FIG. 10 is a view similar to FIG. 9 showing the alternate embodiment with selected components removed for purposes of illustration.

DETAILED DESCRIPTION OF PREFERRED EMBODIMENTS

Figure 1:
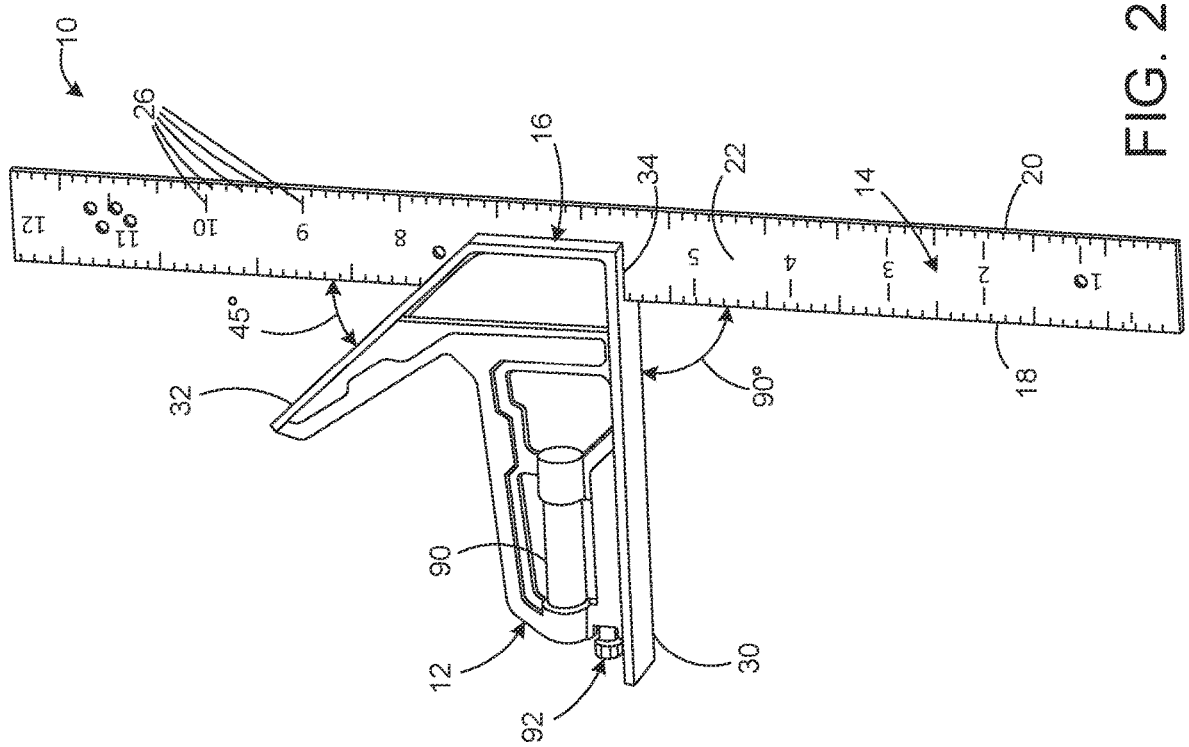
FIG. 1 is a view
Figure 2:
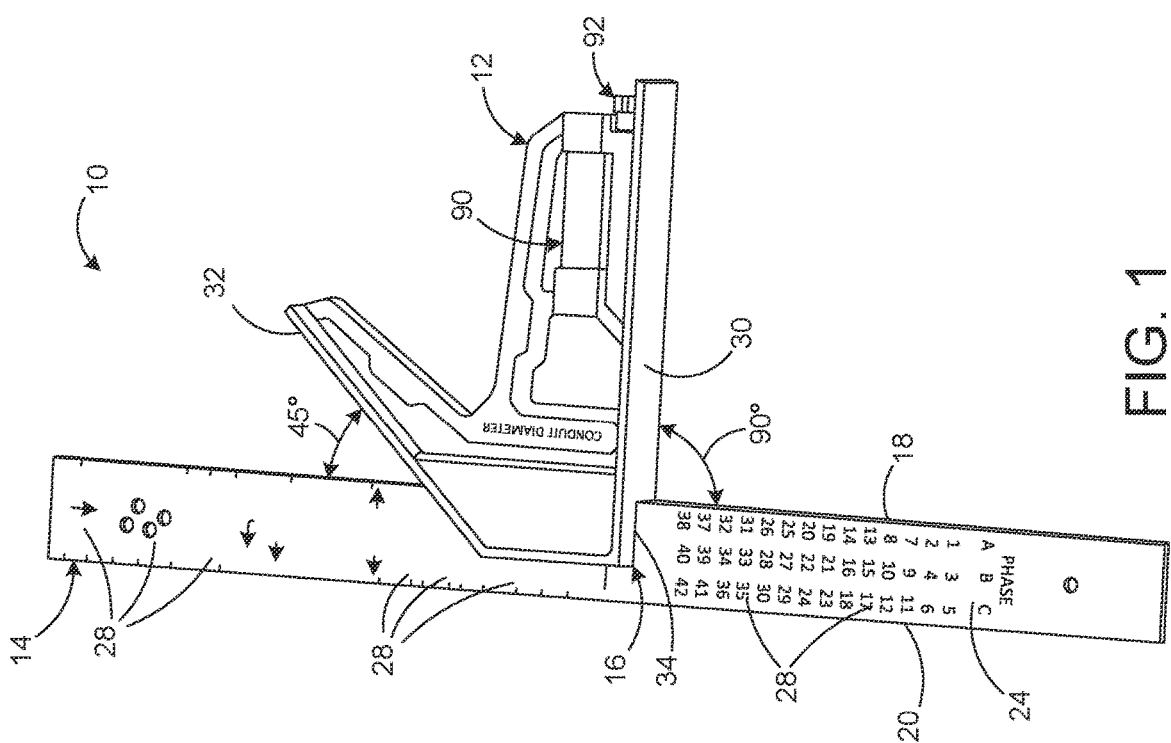
FIG. 2 is a perspective view from above, front and right of the combination square of FIG. 1.
Figure 3:
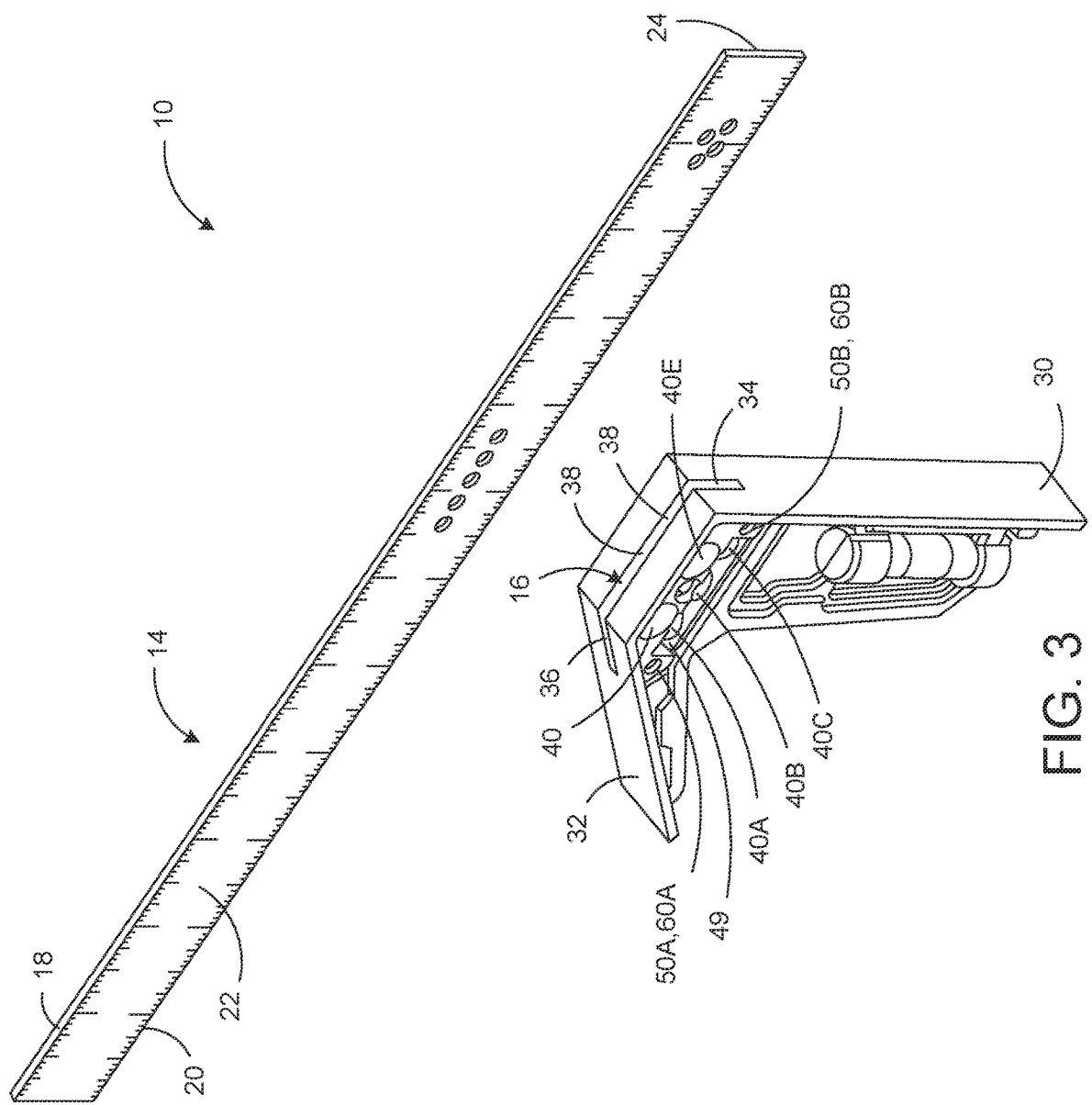
FIG. 3 is an enlarged, exploded, perspective view from above, front and right of the combination square of FIGS. 1 and 2 showing a ruled blade removed from a blade slot of a square head of the combination square.

As best seen in FIGS. 1-3, a combination square 10 according to this disclosure includes a square head 12 and a ruled blade 14. The square head 12 has a blade receiving channel or slot 16 (best seen in FIG. 3) that receives the blade 14 and retains the blade 14 at any position along the length of the blade 14. As is typical, the blade 14 has a rectangular shape with two long planar surfaces in the form of planar edges 18 and 20 spaced by two planar surfaces in the form of planar faces 22 and 24, with ruled measurements 26 provided on the face 22 adjacent along each long planar edge 18 and 20. In the illustrated embodiment, additional indicia 28 is provided on the opposite face 24, some of which is a provided along each planar edge 18 and 20. Again as is typical, the head 12 includes a pair of planar faces or surfaces 30 and 32 for abutment against a workpiece (such as a piece of lumber, drywall, or conduit), with the surface 30 forming a 90 degree angle relative to planar edges 18 and 20 of the blade 14 and the surface 24 forming a 45 degree angle relative to the planar edges 18 and 20 of the blade 14. As is also typical and as best seen in FIG. 3, the slot 16 has an end opening 34 in the planar surface 30 and an opposite end opening 36 in the planar surface 32, with a pair of planar slot surfaces or sidewalls 38 facing each other and extending parallel to each other to define the slot 16 therebetween.

Figure 4A:
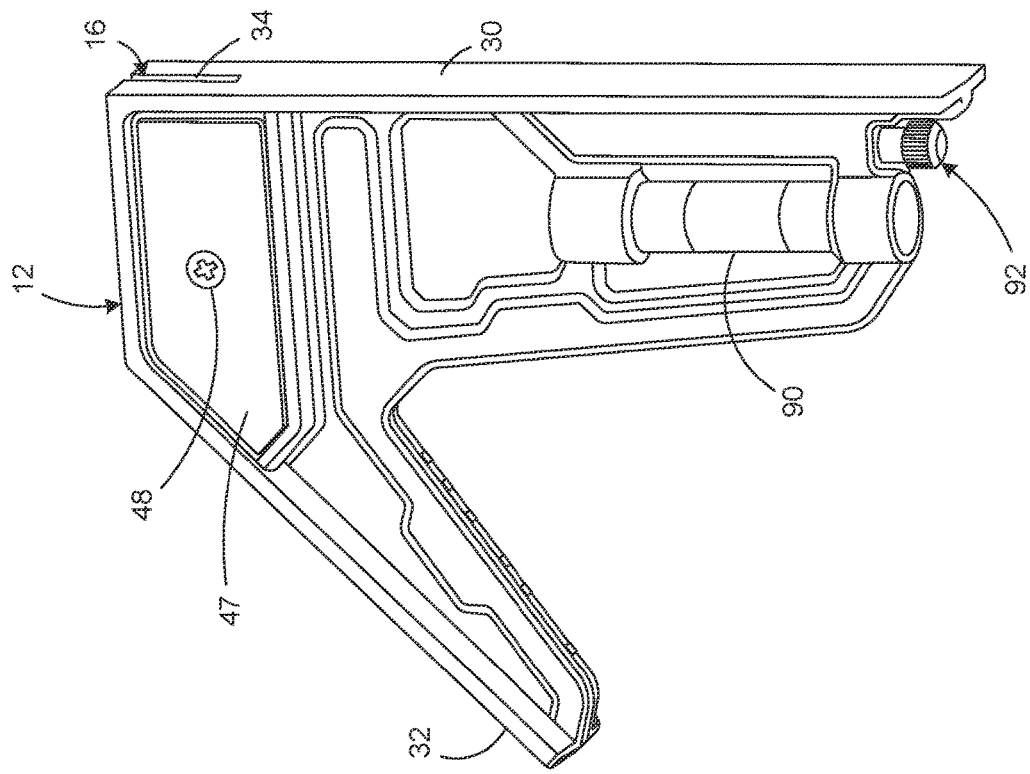
FIG. 4A is an enlarged, exploded, perspective view from below, front and right of the square head of the combination square of FIGS. 1-3 showing a retaining cover and fastener removed from the square head.
Figure 4B:
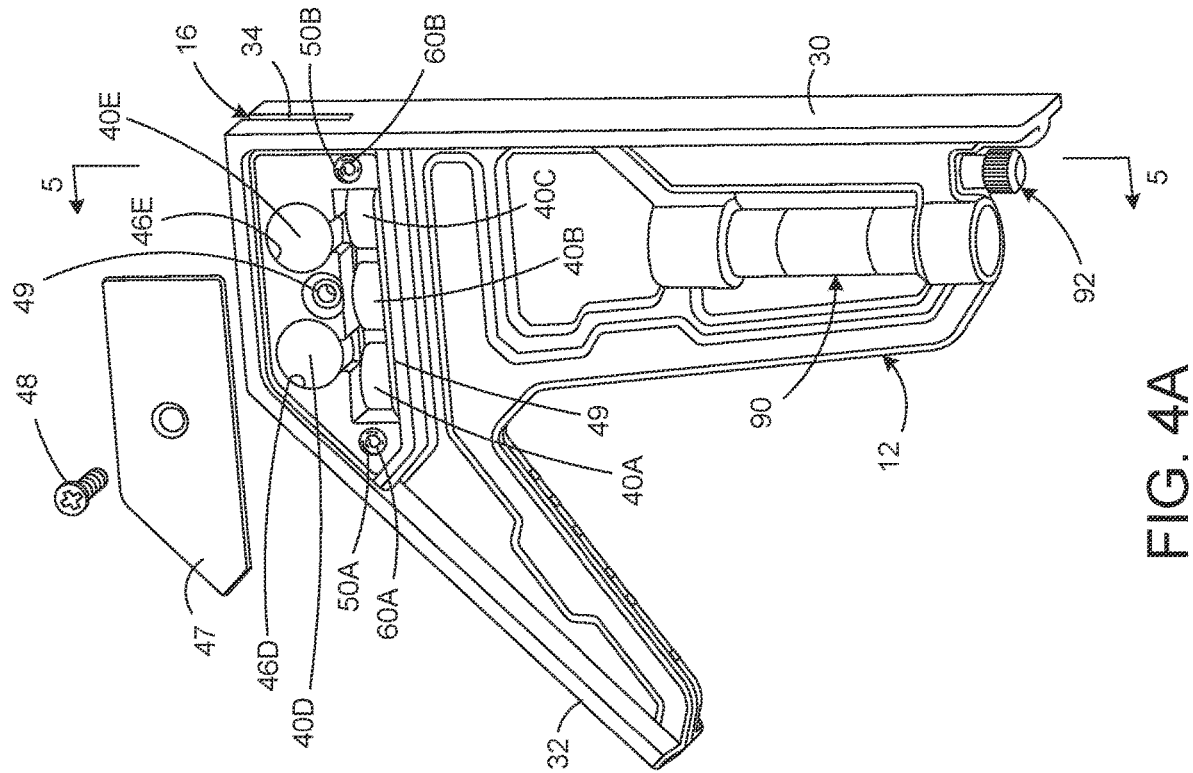
FIG. 4B is a view similar to FIG. 4A but showing the retaining cover and fastener assembled to the square head.
Figure 5:
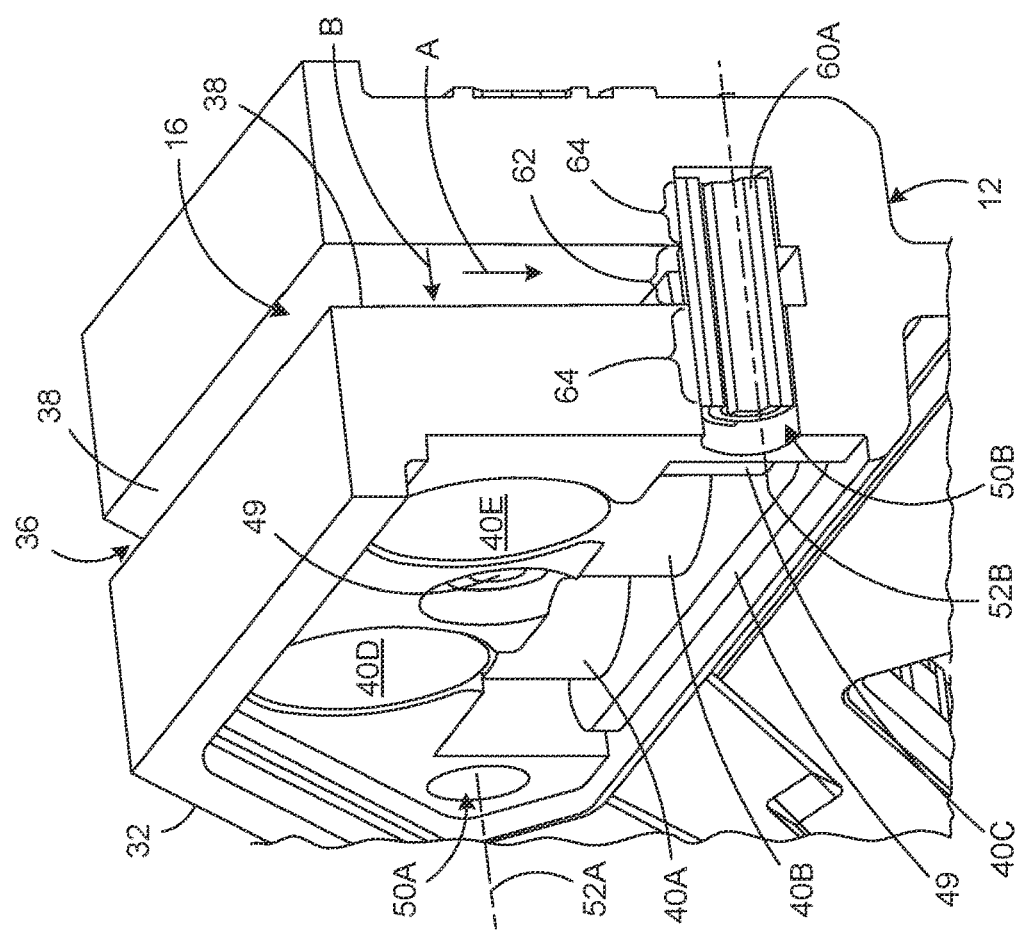
FIG. 5 is an enlarged partial section view taken generally along line 5-5 in FIG. 4A.

As best seen in FIGS. 3-5, in the illustrated embodiment, the combination square 10 includes five magnets 40 mounted in the head 12, with three of the magnets 40A, 40B, and 40C being arranged so that their N-S poles are aligned parallel to the planar slot surfaces 38 and two of the magnets 40D and 40E arranged so that their N-S poles are aligned perpendicular to the slot surfaces 38. In this regard, each of the magnets 40A, 40B, and 40C are mounted in a corresponding pocket or recesses 42A, 42B, and 42C, (best seen in FIG. 5) with concave divider walls 44 located between the recesses 42A, 42B, and 42C and shaped to conform to the outer cylindrical surface of the magnets 40A, 40B, and 40C. Each of the magnets 40D and 40E is mounted in a corresponding pocket or recess 46D and 46E having cylindrical walls that conform to the outer cylindrical surface of the magnets 40D and 40E. Preferably, the combination square includes a retaining cover 47 that can be fixed to the head 12 using any suitable structure, many of which are known, such as for example, a threaded fastener 48 engaged in a threaded bore 49 in the head 12 as shown in FIGS. 4A and 4B. The magnets 40 releasably retain the blade 14 in the slot 16 during use, while allowing the blade 14 to be adjusted to different positions along the length of the blade 14 as required for each desired use. In this regard, the magnets 40A, 40B, and 40C provide a magnetic force that urges the blade 14 into engagement in the slot 16 in the direction generally indicated by arrow A in FIG. 5, and the magnets 40D and 40E provide a magnetic force that urges the blade 14 against one of the slot surfaces 38 in the direction generally indicated by Arrow B in FIG. 5. Optionally, but preferred and as shown in the illustrated embodiment, a metallic backer plate 49 can be located on an opposite side of the magnets 40A, 40B, and 40C from the ruler 14 to enhance their magnetic force. While the arrangement shown in the illustrated embodiments is preferred, it should be understood that other arrangements and configurations of magnets may be desirable depending upon the desired application for the combination square 10. For example, more of fewer magnets may be desirable, magnets of a different size or shape may be desirable, and magnets mounted in a different location or orientation may be desirable. Furthermore, it should be understood that more conventional structures for releasably retaining the blade 14 in the slot 16 may also be used in the combination square 10 according to this disclosure, including the grooved blade and tanged knob actuated locking bolt discussed in the Background section of this disclosure.

Figure 6:
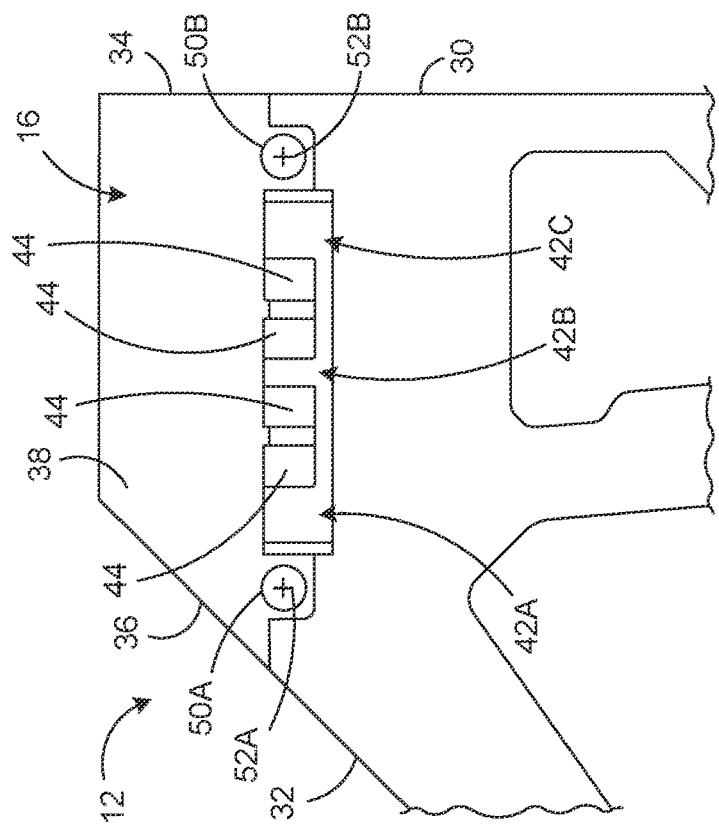
FIG. 6 is an enlarged partial section view taken along a line centered on the blade slot of the square head of FIGS. 1-5, with selected components of the combination square removed for purposes of illustration.
Figure 7:
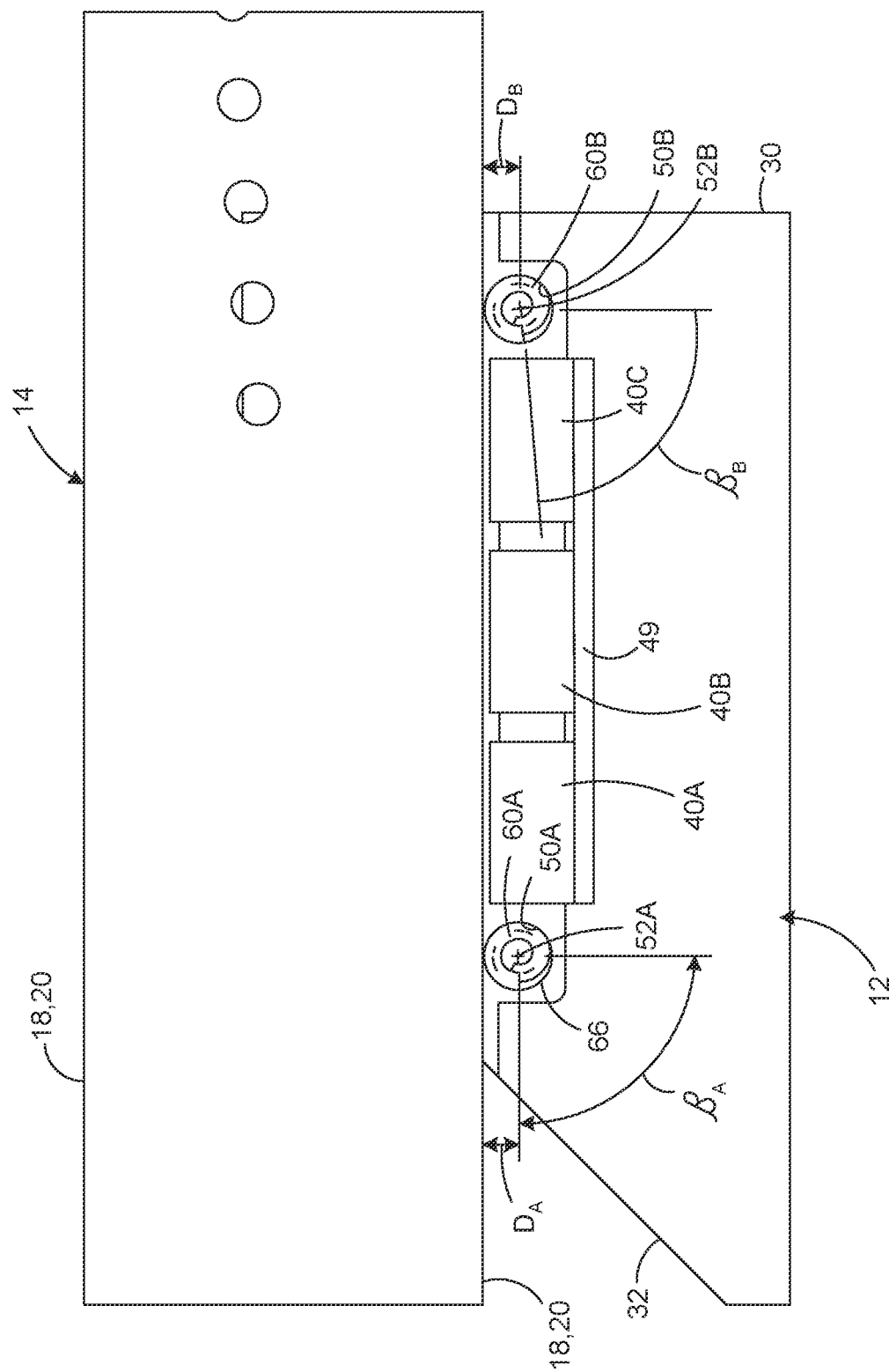
FIG. 7 is a view similar to FIG. 6 but further enlarged and showing selected component of the combination square in their assembled position.

As best seen in FIGS. 4-6, in the illustrated embodiment, the head 12 includes a pair of spaced bores 50A and 50B, with each bore 50 being centered on a corresponding bore axis 52A and 52B and a portion of each bore 50 extending through a lower portion of the slot 16. In the illustrated embodiment and as best seen in FIG. 6, the bore axes 52A and 52B are centered on an imaginary line 54 that extends perpendicular to the planar surface 30 and at a 45 degree angle relative to the planar surface 32, with the axes 52A and 52B extending parallel to both of the planar surfaces 30 and 32. As best seen in FIGS. 4, 5, and 7, the combination square 10 of the illustrated embodiment further includes a pair of spiral roll pins 60A and 60B, with each of the pins 60 engaged in a corresponding one of the bores 50. As best seen in FIG. 6 for the pin 60B but equally accurate for the pin 60A, a portion 62 of each pin 60 extends though the slot 16 and end portions 64 of each pin 60 are engaged in portions of the corresponding one of the bores 50 on opposite sides of the slot 16.

The outermost surface 66 of each pin 60 functions to define a distance D that the blade 14 is spaced from each bore axis 52 in a direction parallel to the planar surface 30 at each pin location in the slot 16, as shown the distances DA and DB in FIG. 7. Each of the pins 60 has a rotational position B about the corresponding bore axis 52 that can be adjusted by rotating the pin 60 in the corresponding bore 50. Those skilled in the art will understand that the rolled construction of spiral roll pins, such as the pins 60, inherently provide an outermost surface 66 that is eccentric (non-concentric) to the corresponding bore axis 52 that the pin 60 is engaged in. Accordingly, each the distances DA and DB can be adjusted by rotating the corresponding pin 60A and 60B about the corresponding bore axis 52A and 52B to alter the rotational position B. As discussed more fully below, this adjustment allows for the blade 14 and each of its planar edges 18 and 20 to be tuned or squared relative to the planar surface 30 to achieve the desired accuracy of the relative angle (preferably 90 degrees) between the planar surface 30 and each of the planar edges 18 and 20.

The pins 60 are preferably made from a suitable hardened metallic material, many of which are known. The blade 14 is preferably made from a suitable metallic material, again many of which are known, that can be acted upon by the magnetic forces of the magnets 40. The head 12 is also preferably formed from any suitable metallic material, again many of which are known, and in preferred embodiments is a one-piece, unitary component formed from a material that is easily cast and machined. The magnets 40 can be of any suitable magnetic material but are preferably rare earth magnets. One advantage of the structure disclosed herein is that the use of the pins 60 allows for the head 12 to be made from a material that can be machined easier or at a lower cost than the material used in the heads of conventional combination squares that require a higher material hardness for the lands that engage the blade in the blade slot.

Figure 8:
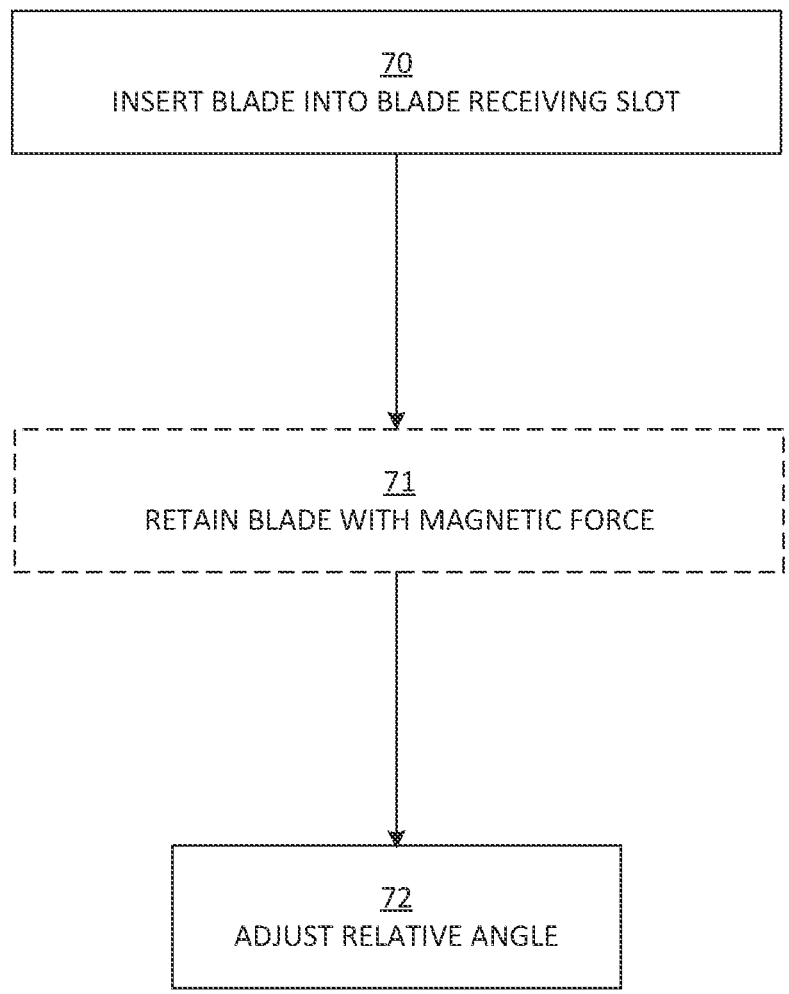
FIG. 8 is a block diagram illustrating methods for squaring a combination square according to this disclosure.

FIG. 8 presents a box diagram of a method of truing or squaring a combination square according to this disclosure. In this regard, it should be understood that as used herein the term "squaring" is intended to mean the process by which a desired relative angle of any degree is achieved between a planar surface on the head of a combination square and a planar surface on a blade, such as either of the planar surfaces 30 and 32 on the head 12 and either of the planar edges 18 and 20 on the blade 14, and is not limited to just a 90 degree relative angle, although for most combination squares that will be the most common desired angle that one will seek to achieve using the method disclosed herein. Furthermore, is should be understood that the term "desired relative angle" is intended to mean a specific angle plus or minus a desired accuracy or tolerance and thus represents a range centered on a specific angle. For example, if the specific angle is 90 degrees and the desired accuracy or tolerance is plus or minus 0.01 degrees, the desired relative angle would be any angle between 89.99 and 90.01 degrees. The method is directed to squaring a combination square, such as the combination square 10, that includes a ruled blade 14 and a head 12, with the head 12 having a blade receiving slot 16 and at least one bore 50 centered on a bore axis 52 with a portion of the bore 50 extending through the blade receiving slot. The method includes the step of inserting the blade 14 into a releasably retained position in the blade receiving slot 16 of the head 12, as shown by block 70, and a next step of adjusting a relative angle between the head 12 and the blade 14 by rotating a spiral roll pin 60 retained in the bore 52 about the bore axis 52 with a portion of the pin 60 extending through the slot 16 until a desired relative angle is achieved between the head and the blade, as shown by step 72. The determination of when the desired relative angle is achieved can be made using any of the well-known techniques/methods for accurately measuring the relative angle between two surfaces, including but not limited to using a coordinate measuring machine, surface plates, and an angle gage blocks. It is preferred that a measuring technique be used that allows the measurement to be made while the spiral roll pin 60 is being rotated about the axis 52, which provides the quickest means for achieving the desired relative angle. For example, when an angle gage block is used on a surface plate to achieve a desired angle, one of the planar surfaces 30 or 32 of the head 12 can be placed in contact with the surface plate and the other planar surface 18 or 20 of the blade 14 can be placed in contact with a suitably accurate angle gage block while the pin 60 is rotated in the bore 52 about the axis 52 until the entire length of the planar surface 30 or 32 is in contact with the surface plate and the entire length of the planar surface 18 or 20 is in contact with the angle gage block.

A preferred version of the method is directed to a combination square 10 with a head 12 that has another bore 52 centered on another bore axis 52 with a portion of the another bore 52 extending through the blade receiving slot 16. In this preferred version of the method the adjusting step of block 72 further includes rotating another spiral roll pin 60 retained in the another bore 52 about the another bore axis 52 with a portion of the another spiral roll pin 60 extending through the slot 16 until the desired relative angle is achieved between the head 12 and the blade 14. The use of two spiral pins 60 for the adjustment of the relative angle allows for a greater range of adjustment and for the adjustment to be made more accurately for each increment of rotation of each of the spiral roll pins 60.

As shown in block 71, an optional and preferred step can be included wherein the blade 14 is retained in the slot 16 by a magnetic force, such as by the magnetic force of the magnets 40. It should be understood that this step is optional because other means/structure can be used to retain the blade 14 in the slot 16 according to the method disclosed herein, including for example, the conventional blade groove engaged by a tang on a knob actuated locking bolt described in the Background section of this disclosure.

FIGS. 9 and 10 show a preferred version of the combination square 10 according to this disclosure wherein wear shield 80 is provided between each of the pins 60 and the blade 14, with the wear shield 80 sandwiched between each of the pins 60 and one of the planar edges 18 and 20 of the blade 14, abutting each of the pins 60 and the one of the planar edges 18 and 20. In the illustrated embodiment, the wear shield 80 is provided in the form of a thin strip 81 of sheet material that extends in the slot between the pins 60A and 60B, with end segments 82A and 82B of the strip 80 wrapped around a corresponding one of the pins 60A and 60B. Preferably the strip 80 has a uniform thickness t over its entire length and is made from a material, such as bronze, that has a lower material hardness than the blade 14 and that provides a reduced friction against the blade 14 in comparison to the material of the pins 60. It has been found that the use of a wear shield 80 as disclosed herein reduces or prevents undesirable wear and/or deformation of the planar edges 18 and 20 as the edges are translated past the pins 60 with the blade 14 retained in the slot 16. It should be understood that while the wrapping of the end segments 82 around the pins 60 is a preferred form for retaining the strip 81 in the head 12, other suitable structure can be used to retain the strip 81 in the head 12, such as, for example, engaging the end segments in slots formed in the head 12 or by bonding the end segments to the head 12. It should further be understood that for purposes of assembly, the end segments 82 are first shaped to wrap around the pins 60, the strip is assembled down into the slot 16 and the pins 60 are then inserted into the bores 50 and through the end segments 82. It should also be understood that while it is preferred that the wear shield 80 be provided in the form of the strip 81 which is a unitary, one-piece component, the wear shield 80 can be provided in the form of two separate components with each of the separate components being sandwiched between a corresponding one of the pins 60 and the blade 14. Is should also be understood that when performing the method described above and shown in FIG. 8, the wear shield 80 should be in place, sandwiched between each of the pins 60 and the blade 14 when performing each of the steps of the method.

For completeness, it will be noted that preferred embodiments of the combination square 10 will also include a bubble level 90 retained in the head 12 and extending parallel to the planar surface 30 and a scriber pin 92 releasably retained in a bore 94 of the head 12 and extending parallel to the planar surface 30.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the combination square 10 and squaring method are shown in the figures, it should be understood that this disclosure anticipates variations in the specific details of each of the disclosed components, features and steps of the combination square 10 and squaring method and that no limitation to a specific form, configuration, step or detail is intended unless expressly and specifically recited in an appended claim.

Figure 11:
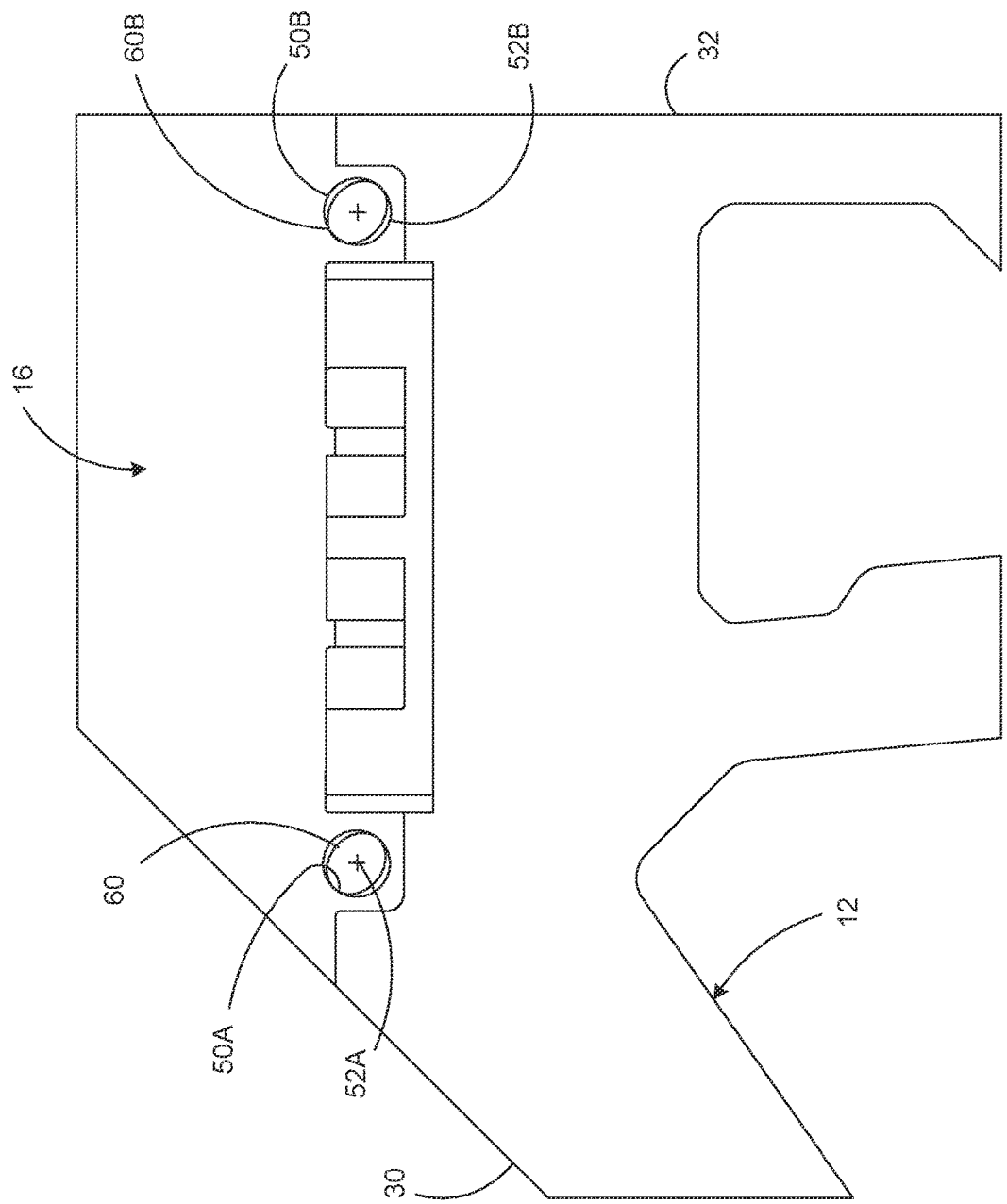
FIG. 11 is a view similar to FIG. 6 but showing an alternate form of a pin according to this disclosure.

For example, while specific and preferred forms have been shown for the pins 60, other forms of pins that provide eccentric (non-concentric) outermost surfaces may be used. For example, as shown in FIG. 11, the pins 60 can be provided in the form of a pin with an oval cross-section or any other multi-lobed pin such as a pin with a tri-lobed cross-section. However, it should be understood that the spiral roll pins illustrated and described herein provide a significant advantages with respect to cost and installation. As another example of alternative embodiments, while the illustrated embodiments show two of the pins 60 the provide an eccentric outermost surface, in some embodiments it may be desirable to provide only one pin 60 with an eccentric outermost surface and to substitute a cylindrical pin with a concentric outermost surface for either the pin 60A or the pin 60B. It may also be desirable substitute a land structure that is a unitary part of the head 12 for one of pins 60. As yet another example, while the planar surfaces 30 and 32 are shown with a relative angle of 45 degrees, other relative angles may be desirable. Similarly, while the head 12 is shown with two planar surfaces 30 and 32, it may be desirable for the head to have a single planar surface or to have more than two planar surfaces for abutting a workpiece.

It will be appreciated by those skilled in the art that the structures and methods disclosed herein are far less labor intensive and time consuming than the conventional structures and methods described in the Background section of this disclosure and therefore provide a significant cost savings in comparison to the same. Furthermore, it should be appreciated that the structures and methods according to this disclosure allow a user to more efficiently re-square a combination square after it has been used to the point that it no longer provides a desired relative angle.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

All references, including publications, patent applications, and patents, cited herein are hereby incorporated by reference to the same extent as if each reference were individually and specifically indicated to be incorporated by reference and were set forth in its entirety herein.

What is claimed is:

1. A combination square comprising:
   a head having a planar head surface to abut a workpiece, a blade receiving slot having an end opening in the planar head surface, and a pair of spaced bores, with each bore centered on a corresponding bore axis and a portion of each bore extending through the blade receiving slot;
   a pair of spiral roll pins, each of the pins engaged in a corresponding one of the bores with a portion of the pin extending through the blade receiving slot and portions of the pin engaged in portions of the corresponding one of the bores on opposite sides of the blade receiving slot, each pin having a rotational position about the corresponding bore axis; and
   a ruled blade releasably received in the blade receiving slot and having a planar blade surface that extends from the end opening in the first planar head surface; and
   wherein a relative angle between the planar head surface and the planar blade surface is determined by the rotational position of each of the pins.

2. The combination square of claim 1 further comprising a wear shield located between the planar blade surface and each of the pins, with the wear shield abutting the planar blade surface and each of the pins.

3. The combination square of claim 1 wherein the wear shield comprises a strip of material having a pair of end segments, each end segment being wrapped around a corresponding one of the pins.

4. The combination square of claim 1 wherein the planar blade surface abuts each of the pins.

5. The combination square of claim 1 wherein the relative angle is 90 degrees.

6. The combination square of claim 1 wherein the head further comprises another planar head surface to abut a workpiece, the blade receiving slot has an end opening in the another planar head surface, a relative angle between the planar head surfaces equals 45 degrees, and a relative angle between the another planar head surface and the planar blade surface is determined by the rotational position of each of the pins.

7. The combination square of claim 1 further comprising at least one magnet mounted in the head and wherein the blade is releasably retained in the slot by a magnetic force of the at least one magnet.

8. The combination square of claim 1 further comprising a bubble level mounted in the head extending parallel to the planar head surface.

9. The combination square of claim 1 wherein the head comprises a pair of planar slot surfaces facing each other to define the slot, the slot surfaces extending parallel to each other, each of the bores extend through the slot surfaces, and each of the bore axes is perpendicular to the slot surfaces.

10. The combination square of claim 1 further comprising a wear shield sandwiched between the planar blade surface and the pin, with the wear shield abutting the planar blade surface and the pin.

11. The combination square of claim 1 wherein the planar blade surface abuts the pin.

12. The combination square of claim 1 further comprising at least one magnet mounted in the head and wherein the blade is releasably retained in the slot by a magnetic force of the at least one magnet.

13. A combination square comprising:
    a head having a planar head surface to abut a workpiece, a blade receiving slot having an end opening in the planar head surface, and a bore centered on a bore axis with a portion of the bore extending through the blade receiving slot;
    a spiral roll pin engaged in the bore with a portion of the pin extending through the blade receiving slot and portions of the pin engaged in portions of the bore on opposite sides of the blade receiving slot; and
    a ruled blade releasably received in the blade receiving slot and having a planar blade surface that extends from the end opening in the first planar head surface; and
    wherein a relative angle between the planar head surface and the planar blade surface can be adjusted by rotating the pin about the bore axis.

14. The combination square of claim 13 wherein:
    the head further comprises another bore centered on another bore axis with a portion of the another bore extending through the blade receiving slot;
    the combination square further comprises another spiral roll pin engaged in the another bore with a portion of the another spiral roll pin extending through the blade receiving slot and portions of the another spiral roll pin engaged in portions of the another bore on opposite sides of the blade receiving slot; and
    wherein a relative angle between the first planar head surface and the planar blade surface can be adjusted by rotating the another spiral roll pin about the another bore axis.

15. The combination square of claim 14 further comprising a wear shield sandwiched between the planar blade surface and each of the pins, with the wear shield abutting the planar blade surface and each of the pins.

16. The combination square of claim 15 wherein the wear shield comprises a strip of material having a pair of end segments, each end segment being wrapped around a corresponding one of the pins.

17. The combination square of claim 13 wherein the head comprises a pair of planar slot surfaces facing each other to define the slot, the slot surfaces extending parallel to each other, the bore extends through the slot surfaces, and the bore axis is perpendicular to the slot surfaces.

18. A method of squaring a combination square comprising a ruled blade and a head, the head having a blade receiving slot and a bore centered on a bore axis with a portion of the bore extending through the blade receiving slot, the method comprising the steps of:

inserting the blade into a releasably retained position in the blade receiving slot of the head; and adjusting a relative angle between the head and the blade by rotating a spiral roll pin retained in the bore about the bore axis with a portion of the pin extending through the slot until the blade is squared with the head.

19. The method of claim 18 wherein:

the head has another bore centered on another bore axis with a portion of the another bore extending through the blade receiving slot; and the adjusting step further comprises rotating another spiral roll pin retained in the another bore about the bore axis with a portion of the another spiral roll pin extending through the slot until the blade is squared with the head.

20. The method of claim 18 further comprising retaining the blade in the slot with a magnetic force.

21. A combination square comprising:

a head having a planar head surface to abut a workpiece, a blade receiving slot having an end opening in the planar head surface, and a bore centered on a bore axis with a portion of the bore extending through the blade receiving slot;

a pin engaged in the bore with a portion of the pin extending through the blade receiving slot and portions of the pin engaged in portions of the bore on opposite sides of the blade receiving slot, the pin having an eccentric outermost surface; and a ruled blade releasably received in the blade receiving slot and having a planar blade surface that extends from the end opening in the first planar head surface; and wherein a relative angle between the planar head surface and the planar blade surface can be adjusted by rotating the eccentric outermost surface of the pin about the bore axis.

\* \* \* \* \*